Jan. 25, 1927. 1,615,485
W. H. REES
WEIGHING APPARATUS
Filed Oct. 14, 1920 4 Sheets-Sheet 2
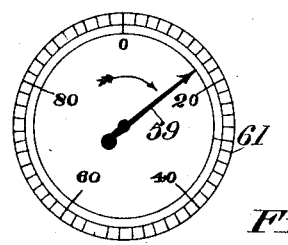
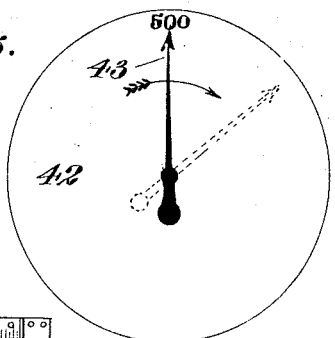
Inventor,
William H. Rees

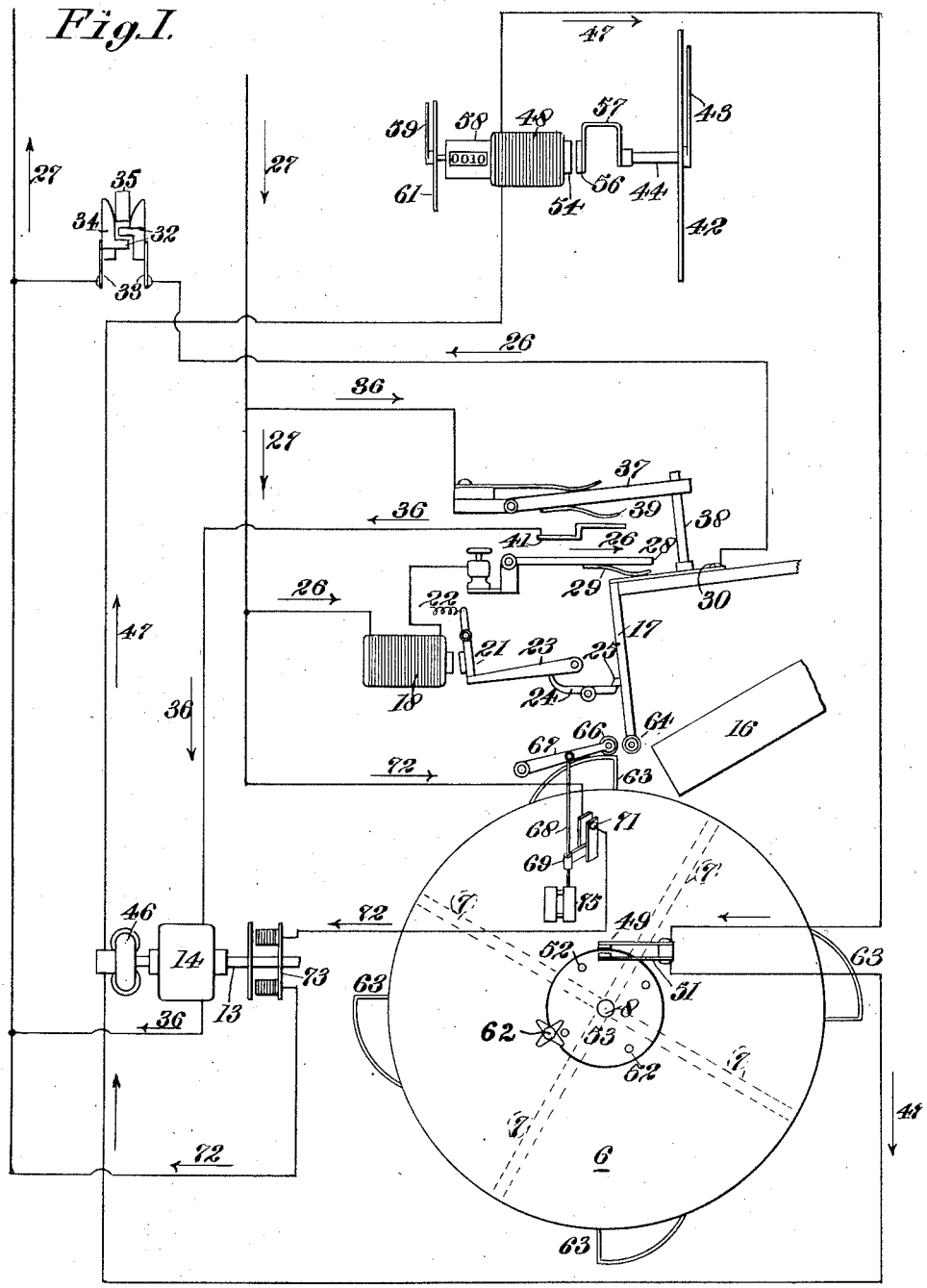

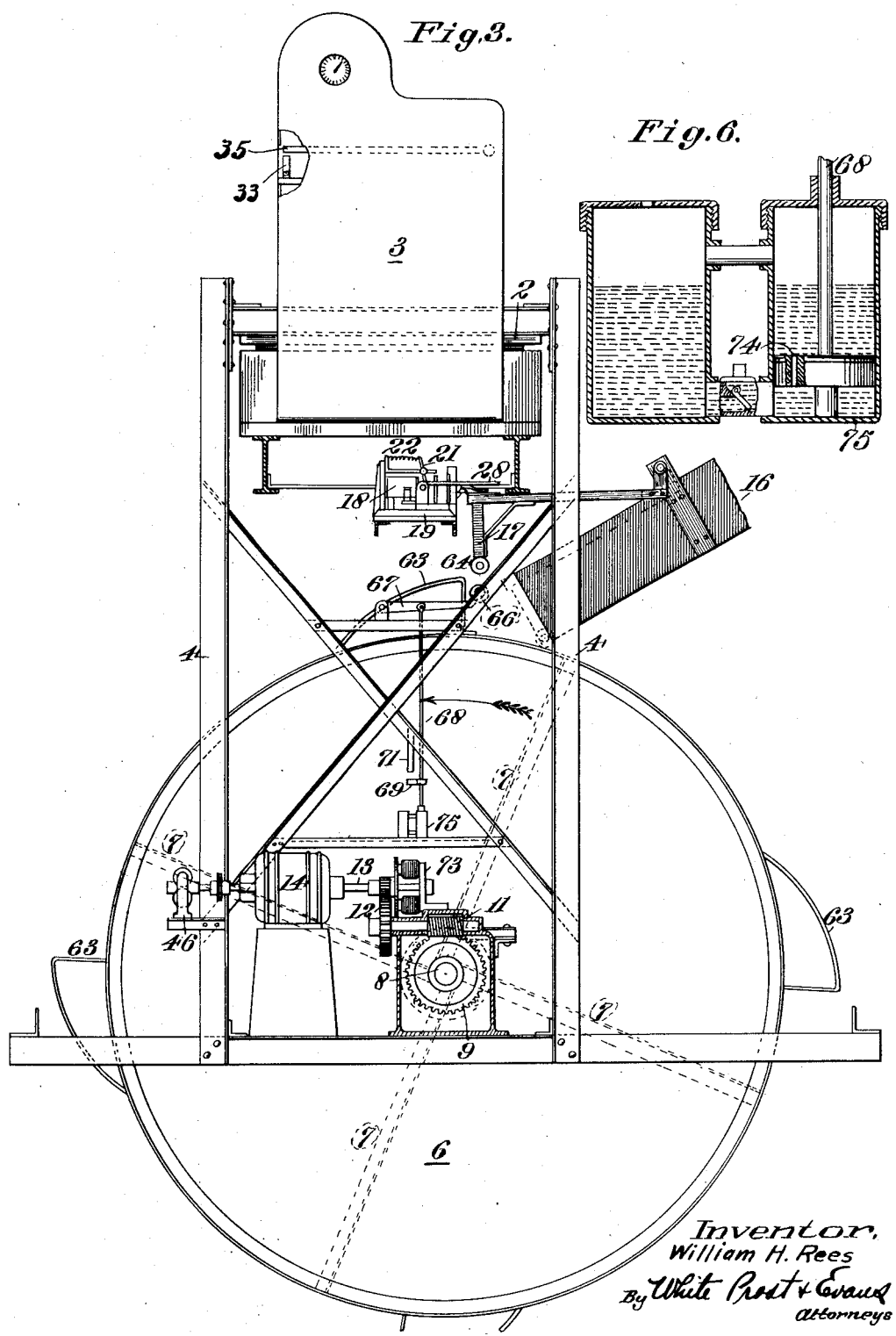

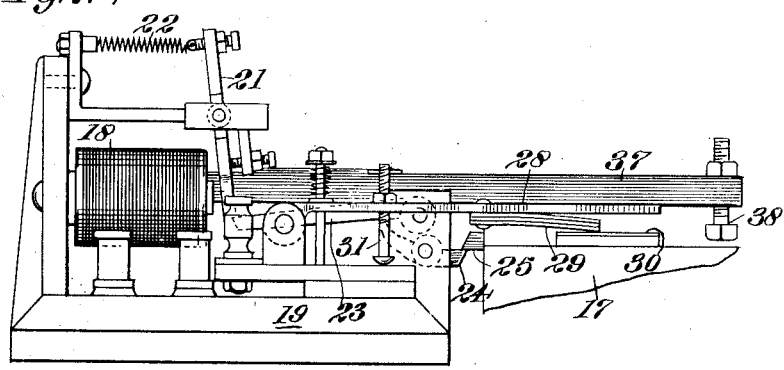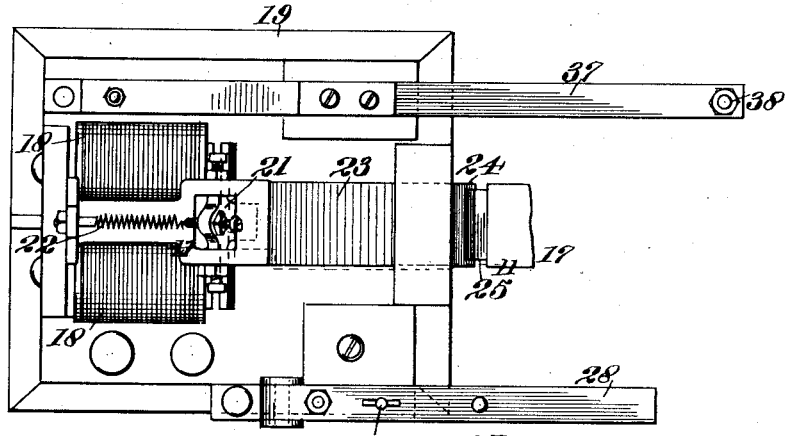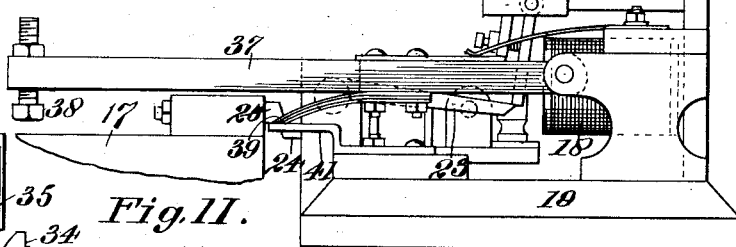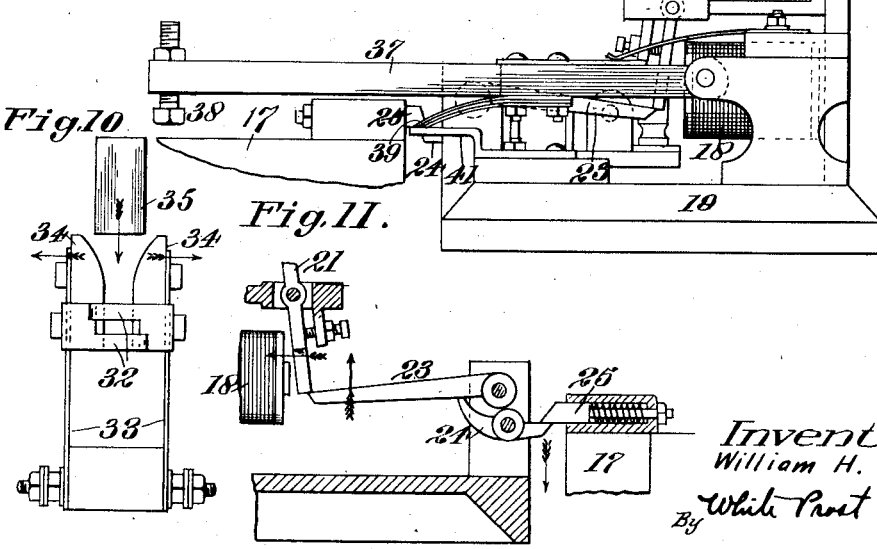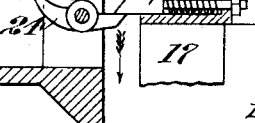

Patented Jan. 25, 1927.

1,615,485

UNITED STATES PATENT OFFICE.

WILLIAM H. REES, OF BERKELEY, CALIFORNIA.

WEIGHING APPARATUS.

Application filed October 14, 1920. Serial No. 416,917.

My invention relates to weighing devices, and an object of the invention is to provide a weighing apparatus capable of continuous operation, that is to say, one in which a continuous succession of loads is weighed, recorded and discharged. Another object is the provision of a weighing apparatus for handling material dscharging from a chute and which will record with close accuracy the weight of each successive total load including the dribble or overage load which is in the air at the instant the completion of the unit load effects the closing of the chute and the momentary interruption of the flow of material pending the discharge of the weighed total load.

The invention possesses many other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Fig. 1 is a diagrammatical representation of the apparatus. Figs. 2 and 3 are front and side elevations respectively of the apparatus. Figs. 4 and 5 are elevations respectively of the overage load and unit load dials. Fig. 6 is a vertical section thru the control mechanism of the switch controlling the brake. Figs. 7, 8 and 9 are right side elevation, plan and left side elevation respectively of the unit of mechanism controlling the flow of material to the hopper and the switch controlling the motor. Fig. 10 is an elevation of the scale beam operated switch the closing of which initiates the operation of the apparatus. Fig. 11 is an elevation showing with greater clearness parts of mechanism shown in Fig. 7.

In the handling of copra, grain and many other commodities it is frequently desirable to know exactly what amount of material passes a given point somewhere in the movement of the material between its receipt in the raw state and its shipment as finished product. At such a time the gross amount is usually the result of approximate calculation based on the totalized weights of successive loads, each the subject of special attention and recordation; or it is based on the totalized weights of predetermined unit loads plus the estimated overage or dribble load. This overage is estimated by determining thru experiment what is the average or mean overage for each load and multiplying this mean by the number of loads. Of course this method is only approximate and does not give results sufficiently accurate for valuable material, or for material, the nature of which causes considerable fluctuation in the overage. The broad purpose therefore, of my invention is the provision of an apparatus with which the total quantity of material passing a given point, or the total quantity passing a given point in a given time, may be accurately weighed and recorded.

In terms of broad inclusion my invention comprises a rotary hopper wheel into which the material to be weighed is dumped from a chute fed by any suitable conveyor. The hopper is supported by the platform of a suitable scale, adjusted so that the beam is raised only when a predetermined unit load is in the hopper. For purposes of explanation such unit load may be assumed to be 500 pounds. The raising of the beam closes an electric circuit which controls magnetically operated mechanism for closing a gate to interrupt the flow of material to the hopper. Concurrently with the closing of the gate a circuit is completed thru a motor which controls the rotation of the hopper to permit discharge of the load. At this moment the hopper contains not only the unit load but also all the dribble or overage which fell from the chute in the period between the accumulation of the exact unit load and the closing of the gate. For a brief period, then, before the total load is dumped, its weight is shown on the dial of the scale, the pointer, of course, moving only after the unit load is exceeded. During these few seconds a circuit is closed thru a magnetic clutch interposed between the shaft of the pointer on the main dial and a second shaft also having a pointer, and a dial back to back with the main dial, and graduated in, say, 100 units representing pounds of overage. A counter on this second shaft records the number of its revolutions. The load now begins to discharge, accompanied of course by the recovery movement of the main dial shaft which for the moment is connected with the second shaft.

The second shaft is therefore carried forward an amount corresponding to such recovery movement. With the next total load, the overage is again recorded by the additional forward movement of the second or overage dial shaft. When a complete revolution has been made, 100 pounds of overage and one revolution of the overage dial shaft have been recorded. It is obvious then that at any time the total overage is 100 pounds multiplied by the number of revolutions, plus the reading on the overage dial. Each hopper load discharged is also automatically counted, so that the total weight of material passing thru the apparatus is found by multiplying the number of loads dumped by the weight of the unit load and adding the overage.

Concurrently with the movement of the hopper, automatically operating means open the motor and magnetic clutch circuits, close a magnetic brake circuit, and open the gate for a new load to discharge into the hopper wheel.

A detailed description follows: Supported on the platform 2 of a scale 3 of suitable construction is a frame work 4, upon which is rotatively mounted, the hopper wheel 6, divided into compartments by radial walls 7. The hopper shaft 8 is provided with a worm wheel 9 in mesh with worm 11 driven by gearing 12 from the shaft 13 of the motor 14. Owing to the fact that the weight of material in one of the hoppers tends to cause its rotation, means for rotating the hopper wheel, except perhaps to insure or facilitate starting it, is not necessary and the function of the motor is therefore largely to rotate the worm at such speed as to permit the desired rotary motion of the hopper wheel under the impulse of the load.

Fixed on suitable stable supports and projecting above the hopper wheel as shown in Fig. 3 is a chute 16 into which the material to be weighed is introduced by any suitable means, and which discharges into the hoppers. Flow of material from the chute is controlled by a gate 17 pivoted to the chute. Suitably arranged on fixed supports above the gate is mechanism for holding open the gate to permit material to flow into the hopper, and for releasing the gate to close it when the unit load has fallen into the hopper. A pair of electro magnets 18 is mounted on the bed plate 19, and an armature 21 is pivotally arranged adjacent the core, a spring 22 tending to hold the armature away from the core and in position to engage at its lower, squared end the lever 23 pivoted on the bed plate. Pivoted also on the bed plate is the short lever 24, one arm of which engages the lever 23 quite close to its pivot and the other arm of which is adapted to engage under the spring pressed latch 25 which is mounted on the gate. Thus movement of the armature 21 due to the energization of the magnets permits the gate to fall, and when raised again, the latch 25 catches over the lever and holds the gate up until the next movement of the armature releases it.

The magnet circuit 26 is connected across the supply lines 27 and includes a spring-pressed arm 28 pivoted on the bed plate 19 and having a brush 29 resting on a contact 30 on the gate, so that when the gate falls, the magnet circuit is broken. An adjustable stop 31 provides means for adjusting the position of the arm relative to the gate. Inserted also in this circuit is a switch, Fig. 10, comprising the spring contact members 32, mounted on the light spring arms 33. The arms are provided with blocks 34 of insulating material, adapted to be engaged and moved apart by the scale beam 35. When the scale beam rises the circuit is closed; when it falls the circuit is broken. Since the beam rises only when the unit load is reached, it is apparent that the electro-magnets 18 are automatically energized to release the gate when that load is deposited in the hopper. Both the contacts 32 and the arms 33 are very light so that the scale beam meets with a very minimum of resistance in its disengagement from the blocks.

When the unit load is complete it is desirable to start the motor to control the rotation of the hopper wheel thru approximately 90° of arc, so that the load is dumped and an empty hopper is in position to receive a new load when the gate is opened. The motor circuit 36 is connected across the supply lines 27 and includes an arm 37 pivotally mounted on the plate 19. The arm is provided with an adjustable leg 38, normally resting on the gate 17 when the gate is open, and in this relation, holding the brush 39 which is fixed on the arm, out of engagement with the contact 41. When the gate is released and falls, the arm 37 also falls and closes the motor circuit.

Following accession of the unit load and the automatic closure of the gate, there is of course a certain amount of dribble or overage which falls into the hopper. The total load however is complete within a very brief interval after the hopper wheel begins to rotate and will be indicated on the main dial 42 by the deflection of the main pointer 43, the amount of the deflection indicating the weight of the overage, it being remembered that the beam is loaded so that no deflection of the pointer occurs until the unit load is passed. It will be understood that the main dial and pointer may be dispensed with since they perform no essential function. They are however a convenience. For a short period, prior to the beginning of the discharge of the material from the hopper, the total load effects a rotary displacement of the main dial shaft 44, Fig. 1, and means are provided operative during this period for indicating and recording the total amount of the overage in the current and preceding loads. Fixed for rotation with the motor 14, preferably by direct connection, is a direct current generator 46. One side of the D. C. circuit 47 includes the windings of the electromagnet 48 and terminates in the contact 49. The other side of the circuit extends from the generator to the spring switch arm 51, adapted to be deflected into engagement with the contact 49, to close the D. C. circuit, by pins 52 set in the disk 53 which is fixed on the shaft 8 of the hopper wheel. The angular position of the disk and the proportion of the parts is such that the D. C. circuit is closed after the accession of the total load, and opened after the load has been dumped. The core of the magnet 48 comprises a shaft 54, axially alined with the main dial shaft 44 which is provided with a plate 56 mounted thereon by a light resilient arm 57 and closely spaced to the end of the shaft. This mechanism constitutes a magnetic clutch between the shafts 54 and 44. On the other end of the shaft 54 is mounted a counter 58 for indicating each revolution of the shaft, and a pointer 59 moving about the overage dial 61. The dial is graduated to indicate pounds of overage and conveniently may have 100 divisions. The shaft 44 being rotarily displaced by an amount corresponding to the overage load, the closure of the circuit 47 actuates the magnetic clutch which connects the two shafts 44 and 54. As the load dumps, the recovery of shaft 44 is accompanied by an equivalent rotation of the shaft 54. At the conclusion of the movement, the pointer 59 has been moved forward about the overage dial an amount equal to the recovery movement of the main dial shaft, and if the load dumped is the first load to pass thru the hopper wheel, the weight of the overage in pounds is read directly on the overage dial, as for instance 18 pounds, as shown in Fig. 4. A counter 62 suitably actuated by the pins 52 indicates the dumping of one load and since the unit load is 500 pounds, the total weight passed thru the apparatus is 518 pounds. Concurrently with the dumping of the load, the scale beam 35 falls, breaking circuit 26 by the separation of contacts 32, so the subsequent engagement of the brush 29 with contact 30 does not prematurely energize the magnets 18.

With the rotation of the hopper wheel, an empty compartment comes into position below the chute, and means are provided for raising the gate and braking the motor to bring the hopper wheel to rest in proper position. Cams 63 are arranged about the circumference of the hopper wheel, preferably in pairs, with one on each side of the wheel. As the wheel rotates the cams engage rollers 64 on the gate, lifting it so that the latch 25 engages the trigger mechanism including the levers 23 and 24. As the gate rises the leg 38 is pushed upwardly, breaking the motor circuit 36. Concurrently with or quite closely following the breaking of the motor circuit, the cams 63 engage a roller 66 on the pivoted arm 67 to which is connected the long light rod 68 carrying the switch blade 69. Contacts 71, spaced on each side of the blade, are arranged in the circuit 72 connected across the supply lines 27. The circuit 72 includes the coils of the magnetic brake 73, operating on the shaft of the motor 14. With the raising of the switch blade, the magnetic brake circuit is closed and the motor quickly stopped, thus bringing the hopper wheel to rest in the desired position. In order to time the application of the brake, and permit the breaking of the brake circuit only after movement of the hopper wheel has ceased, a dash pot 75, Fig. 6, is provided, the rate of flow of the oil thru the aperture 74 determining the length of time the brake circuit is closed. The weight of the parts is relied on to lower the switch blade.

With the accession of another unit load, the same cycle of operations is repeated, the shaft 44 on its recovery movement only, rotating the shaft 54, and moving the pointer 59 forward an amount equal to the overage load, each accretion being added to the preceding amount. With the completion of one complete revolution, the counter 58 registers "1", indicating in the instant case 100 pounds of overage. At any given time, the total overage for that particular run is the counter reading multiplied by 100 plus the overage dial reading; amounting with the readings shown, to $10 \times 100 + 18$ or 1018 pounds. Since the counter 62 shows the number of loads, this reading multiplied by the unit load plus the overage gives the total weight of material which has passed thru the apparatus, with such accuracy that the error is negligible. Such error as occurs is due to inherent limitations in any scale mechanism designed to handle large loads, and not to the mechanism described herein.

It is to be noted that accidental pressure as by the foot or hand upon the scale platform or attached parts after the magnetic clutch is functioning will not affect the recorded weight, since such pressure, while turning shaft 44 forward, turns shaft 50 backward, the latter regaining the amount lost with the recovery of the shaft 44.

I claim:

1. In a device of the class described, a hopper, means for feeding material into the hopper, means for moving the hopper to dump the load of said material, means actuated by the weight of a predetermined portion of the total load for initiating the operation of said hopper dumping means, and means for indicating the weight of the total load prior to dumping.

2. The combination with a platform scale, of a hopper supported on the platform of said scale, means for feeding material into said hopper, electrically operated means for controlling the movement of said hopper to dumping position, and a switch closed by the movement of the beam of said scale for initiating the action of said hopper controlling means.

3. In a device of the class described, a hopper wheel comprising a plurality of hoppers, means for controlling the rotation of the hopper wheel, means for feeding material into the upper hopper, means actuated by the weight of a predetermined unit load of said material for initiating the operation of the hopper wheel controlling means and interrupting the flow of material to the hopper, and means actuated by the rotation of the hopper wheel for stopping its rotation and reestablishing the flow of material thereto.

4. In a device of the class described, a hopper wheel comprising a plurality of hoppers, means for controlling the rotation of the hopper wheel, means for feeding material into the upper hopper, means actuated by the weight of a predetermined unit load of said material for initiating the operation of the hopper wheel controlling means and interrupting the flow of material to the hopper, means actuated by the rotation of the hopper wheel for stopping its rotation and reestablishing the flow of material thereto, and means for indicating the weight of the material passing thru said hopper wheel.

5. In a device of the class described, a rotatable hopper wheel comprising a plurality of hoppers, a motor, worm gearing interposed between the motor and hopper wheel, means for feeding material to said hopper wheel, means actuated by the weight of a predetermined unit load of said material for causing the motor to rotate the worm to permit rotation of the hopper wheel, means for interrupting the flow of material to said hopper wheel, means for indicating the weight of the material in the hopper, and means actuated by rotation of the hopper wheel for stopping its rotation and reestablishing the flow of material.

6. In a device of the class described, a rotatable hopper wheel comprising a plurality of hoppers, a motor, worm gearing interposed between the motor and hopper wheel, a gate for controlling the flow of material to said hopper wheel, means actuated by the weight of a predetermined unit load of said material for closing the motor circuit and the gate, means for indicating the weight of material in said hopper wheel, and means actuated by the rotation of the hopper wheel for opening the motor circuit and the gate.

7. In a device of the class described, a rotatable hopper wheel comprising a plurality of hoppers, a motor, worm gearing interposed between the motor and hopper wheel, a gate for controlling the flow of material to said hopper wheel, means actuated by the weight of a predetermined unit load of said material for closing the motor circuit and the gate, means for indicating the weight of material in said hopper wheel, and means actuated by the rotation of the hopper wheel for opening the motor circuit and the gate and for braking the motor to stop the hopper wheel in predetermined position.

8. In a device of the class described, a rotatable hopper wheel comprising a plurality of hoppers, a motor, worm gearing interposed between the motor and hopper wheel, a gate for controlling the flow of material to said hopper wheel, means actuated by the weight of a predetermined unit load of said material for closing the motor circuit and the gate, means for indicating the weight of material in said hopper wheel in excess of each unit load, and for totalizing the weight of such overage, means for indicating the number of unit loads passing thru said hopper wheel, and means actuated by the rotation of the hopper wheel for opening the motor circuit and the gate.

9. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, and means operated by the weight of a predetermined unit load of said material for closing the electromagnetic means circuit to effect the closing of the gate.

10. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, means operated by the weight of a predetermined unit load of said material for closing the electromagnetic means circuit to effect the closing of the gate, and means actuated by the rotation of the hopper wheel for opening the gate.

11. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, means operated by the weight of a predetermined unit load of said material for closing the circuits of the electromagnetic means and of the motor, means actuated by rotation of said hopper wheel for opening the motor circuit and the gate, and means for indicating the weight of material in said hopper wheel in excess of said unit load.

12. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, means operated by the weight of a predetermined unit load of said material for closing the circuits of the electromagnetic means and of the motor, means actuated by rotation of said hopper wheel for opening the motor circuit and the gate, means for indicating the weight of material in said hopper wheel in excess of each unit load, means for totalizing the weights of the successive overages, and means for indicating the number of unit loads.

13. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, means operated by the weight of a predetermined unit load of said material for closing the circuits of the electromagnetic means and of the motor, means actuated by rotation of said hopper wheel for opening the motor circuit and the gate, means for indicating the weight of material in said hopper wheel, a magnetic brake for said motor, and means actuated by rotation of said hopper wheel for closing the magnetic brake circuit.

14. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, means operated by the weight of a predetermined unit load of said material for closing the circuits of the electromagnetic means and of the motor, means actuated by rotation of said hopper wheel for opening the motor circuit and the gate, means for indicating the weight of material in said hopper wheel, a magnetic brake for said motor, means actuated by rotation of said hopper wheel for closing the magnetic brake circuit, and means for opening the brake circuit after a predetermined interval.

15. In a device of the class described, a rotatable hopper wheel comprising a number of hoppers, a gate for controlling the flow of material to said hopper wheel, a motor for controlling the rotation of said hopper wheel, a latch for holding open the gate, electromagnetic means for releasing the latch, means operated by the weight of a predetermined unit load of said material for closing the circuits of the electromagnetic means and of the motor, means actuated by rotation of said hopper wheel for opening the motor circuit and the gate, a shaft rotarily displaceable by the weight of the overage in said hopper, a dial and pointer therefor, a second shaft for moving the pointer over the dial, a counter for indicating the number of revolutions of said second shaft, a magnetic clutch interposed between the first and second shafts, and means for closing the clutch circuit subsequent to the accession of the total load in the hopper.

16. In a device of the class described, a shaft, a plurality of hoppers arranged on the shaft, a gate for controlling the flow of material to the hoppers, means actuated by the weight of material in a hopper for closing the gate and rotating the shaft, means actuated by the rotation of the shaft for opening the gate and stopping the shaft, and means for indicating the weight of material passed thru the hoppers.

In testimony whereof, I have hereunto set my hand.

WILLIAM H. REES.